UNITED STATES PATENT OFFICE.

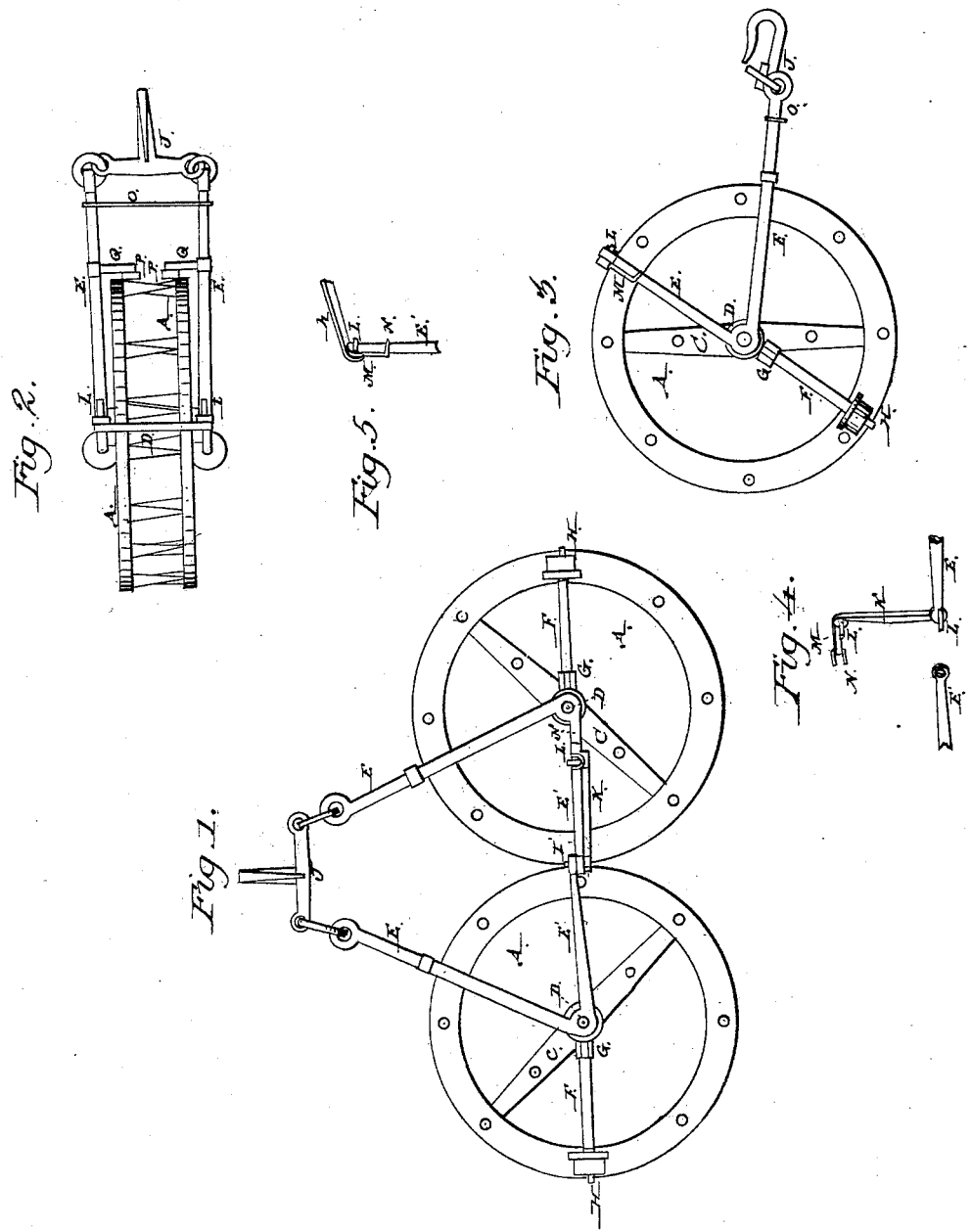

S. M. WADE, OF ANDOVER, OHIO.

IMPROVEMENT IN ROTATING HARROWS.

Specification forming part of Letters Patent No. 23,627, dated April 12, 1859.

*To all whom it may concern:*

Be it known that I, S. M. WADE, of Andover, in the county of Ashtabula and State of Ohio, have invented certain new and useful Improvements in Portable Rotary Harrows; and I do hereby declare that the following is a full and exact description thereof, reference being had to the annexed drawings, making part of this specification, in which—

Figure 1 is a plan view of the harrow. Fig. 2 represents the harrow folded up or so adjusted as to be rendered portable. Fig. 3 is a side view of Fig. 2.

Like letters denote like parts in the several views.

The two harrows A and A are provided with teeth in the usual manner, and to the rim of each harrow is secured an arm, C. From each arm extends a wrist, D D, and to these wrists are connected the angular draw-bars E E'. At the angle of these bars an eye is formed to receive the wrists D D, which constitute an axle or journal, upon which the harrows revolve. The arms F are connected to the angle of the draw-bars by a joint at G, and to the outer end of each arm is attached a roller, H, which rolls upon the rim of each harrow, causing the harrows to revolve in the usual manner. The ends E' of the draw-bars are connected together by a pin or wrist, I, which forms a pin-joint at I', Fig. 1. By means of this articulating-joint and the clevis J and links attached thereto the two harrows are revolved horizontally, and also combined together, as seen in Fig. 1; but for the purpose of transportation the harrows are changed from Fig. 1 to Figs. 2 and 3 in the manner hereinafter described. The pin I, which forms the joint I', is connected with the bar K, Figs. 1, 2, and in section, Fig. 4. At the opposite end of the bar is another pin, L, corresponding to I. From this bar K extends an arm, M, at right angles thereto, and to the end of this arm is connected a fork or clutch, N, Fig. 4. This clutch spans or grasps one of the draw-bars E', as seen at N, Fig. 3, and in section, Fig. 5. When the two harrows are brought together, as seen in Fig. 2, with the teeth inward, in this position the harrows are secured together by having the arms E' above the axle D, as seen in Fig. 2. Then the pins I and L are inserted through the eyes in the ends of the arms E', as seen in Fig. 2. At the same time the arm M depends along the side of the draw-bar, with the clutch or fork N around the said bar, as seen in Figs. 3 and 5. By means of the bar K, extending across the periphery of the harrows, and connecting to the draw-bars E' E' by the pins I L and clutch N, the harrows are held together, as seen in Fig. 2, and by locking the draw-bars E E together by the rod O they are furthermore effectually secured together in a vertical position, so as to be easily drawn, like the wheels of a cart, from one place to another, as the harrows in this position form wheels, which rotate upon the axles D D.

The friction-rollers P P, which are connected with the draw-bars E E by the arms Q Q, cause the harrows to rotate with more ease and facility as the harrows swerve about than they would otherwise; and, also, the harrows are more readily retained in place by the rollers as they act upon the inner face of the harrows, which rollers, in connection with the rod O, will at all times keep the harrows in the desired vertical position. Thus the rollers aid the horizontal and vertical rotation of the harrows which are impinged on the rollers by their swerving and tipping by obstructions, or otherwise.

What I claim as my improvement, and desire to secure by Letters Patent, is—

1. The bar K, provided with the arm M, clutch N, and pins I L, in combination with the angular draw-bars and double harrows, in the manner and for the purpose hereinbefore described.

2. The rod O, arms Q, and rollers P P, in combination with the angular draw-bars and double harrows, when arranged in the manner and for the purpose set forth.

S. M. WADE.

Witnesses:
C. H. BALLOU,
W. H. BURRIDGE.